United States Patent [19]

Nomoto et al.

[11] Patent Number: 5,280,565
[45] Date of Patent: Jan. 18, 1994

[54] FUZZY BACKWARD REASONING DEVICE

[75] Inventors: Kohei Nomoto; Tetsuo Kirimoto; Yoshimasa Ohhashi, all of Kanagawa, Japan

[73] Assignee: Mitsubishi Denki Kabushiki Kaisha, Tokyo, Japan

[21] Appl. No.: 490,761

[22] Filed: Mar. 8, 1990

[30] Foreign Application Priority Data

Mar. 10, 1989 [JP] Japan ................................. 1-58842
May 29, 1989 [JP] Japan ................................ 1-135407

[51] Int. Cl.$^5$ ....................... G06F 15/20; G06F 9/44
[52] U.S. Cl. ................................... 295/51; 395/900
[58] Field of Search ............. 395/61, 900, 51, 52, 395/906, 914, 924, 51, 61; 364/200, 426.01, 150, 431.03, 807

[56] References Cited

U.S. PATENT DOCUMENTS

| | | | |
|---|---|---|---|
| 4,484,193 | 11/1984 | Bellew | 343/5 S A |
| 4,707,697 | 11/1987 | Coulter et al. | 342/25 |
| 4,754,410 | 6/1988 | Leech et al. | 364/513 |
| 4,837,725 | 6/1989 | Yamakawa | 364/807 |
| 4,847,795 | 7/1989 | Baker et al. | 364/579 |
| 4,866,635 | 9/1989 | Kahn et al. | 364/513 |
| 4,875,184 | 10/1989 | Yamakawa | 364/807 |
| 4,912,648 | 3/1990 | Tyler | 364/513 |
| 4,918,620 | 4/1990 | Ulug | 364/513 |
| 5,036,474 | 7/1991 | Bhanu et al. | 364/516 |
| 5,058,033 | 10/1991 | Bonissone et al. | 364/513 |

OTHER PUBLICATIONS

Tong, R. M., "Some Properties of Fuzzy Feedback Systems", IEEE Trans. Syst., Man and Cybernetics, vol. SMC-10, No. 6, Jun. 1990, pp. 327-330.

Hayashi et al., "Efficient Method for Multi-Dimensional Fuzzy Reasoning and Its Application to Fault Diagnosis" IEEE Intl. Workshop on Artificial Intelligence for Industrial Applications 1988, pp. 27-32.

Bogler, P. L., "Shafer-Dempster Reasoning with Applications to Multisensor Target Identification Systems", IEEE Trans. Syst., Man and Cybernetics, SMC-17(6), 1987, 968-977.

Popoli et al., "Expert System Allocation for the Electronically Scanned Antenna Radar", 1987 American Control Conference, 1987, pp. 1821-1826.

Whalen et al., "Good-Directed Approximate Reasoning in a Fuzzy Production System", Approximate Reasoning in Expert Systems, 1985, pp. 505-517.

K. S. Leung et al, "Fuzzy Concepts in Expert Systems", Computer, Sep. 1988, pp. 43-56.

Lofti A. Zadeh, "Fuzzy Logic", Computer, Apr. 1988, pp. 83-93.

*Primary Examiner*—Michael R. Fleming
*Assistant Examiner*—Robert W. Downs
*Attorney, Agent, or Firm*—Wolf, Greenfield & Sacks

[57] ABSTRACT

A sequential type Fuzzy backward reasoning device is disclosed, which is capable of performing computation progressing every time a feature quantity is observed to update reasoning and of performing the reasoning even if the order of observations is arbitrary, by providing means for performing sequential reasoning instead of batch type reasoning means, and feedback means for feeding back a reasoned result.

Additionally, a target recognition device is disclosed which is capable of computing as a numerical value the reliable degree of a recognized result on a target by obtaining another recognizing information even if there is not obtained any information concerning the target, using said sequential type Fuzzy backward reasoning device.

7 Claims, 8 Drawing Sheets

CAUSE     CAUSALITY     FEATURE-
               RELATION       QUANTITY
(?)           (KNOWLEDGE)    (OBSERVABLE)

_5,280,565_

FUZZY BACKWARD REASONING DEVICE

BACKGROUND OF THE INVENTION

1. Field of the Invention

The invention relates to a Fuzzy backward reasoning device useful for application fields requiring reasoning of a cause that causes a feature quantity such for example as target classification in air traffic control, including diagnoses in medical services and fault diagnosis in plants, etc.

2. Description of the Prior Art

Referring to FIG. 6, a prior art Fuzzy backward reasoning device is illustrated in a block diagram. The device is disclosed for example in "Method of Solution to Fuzzy Inverse Problem" Tsukamoto and Tashiro, Papers in the 3rd System Symposium supported by the Society of Instrument and Control Engineers, Vol. 15, No. 1, PP 21 to 25, 1979. As shown in the same figure, a Fuzzy backward reasoning device 5 includes batch reasoning device 51 for receiving all of feature quantities ($b_j$) and causal relations ($|r^j$) for Fuzzy backward reasoning and outputting reasoned results ($\hat{a}_i$), and causality relation storage device 3 for outputting the causality relations ($|r^j$) previously stored in the batch reasoning device 51.

Referring to FIG. 7, a situation of solving a problem in the Fuzzy backward reasoning is illustrated. Designated at 52 is a causality relation.

m causes $a_1, a_2, \ldots, a_m$ are inputted into the causality relation 52, which in turn outputs n feature quantities $b_1, b_2, \ldots, b_n$. $a_1, b_j$ take values from 0 to 1 and indicate the possibility of each cause and the intensity of each feature quantity respectively. These quantities are expressed by row vectors $$a = (a_1, a_2 \ldots a_m) \tag{1}$$

$$|b = (b_1, b_2 \ldots b_n) \tag{2}$$

The causality relation 52 is represented by a m×n matrix $R = (r_{ij})$ with elements $r_{ij}$ taking a value of from 0 to 1, the element indicating a degree where the feature quantity $b_j$ is caused by the cause $a_i$. If each column vector is designated by $|r^j$, then $|r^j$ denotes a causality relation that causes the feature quantity $b_j$. The matrix $|R$ is expressed by $$|R = (|r^1\ |r^2 \ldots |r^n) = \begin{bmatrix} r_{11} & r_{12} & \cdots & r_{1n} \\ r_{21} & & & \\ \vdots & & & \\ r_{m1} & \cdots & \cdots & r_{mn} \end{bmatrix} \tag{3}$$

The relationship among $a$, $|b$, and $|R$, illustrated in FIG. 7 satisfies $$a \circ R = b \tag{4}$$

Here, the symbol 0 indicates max-min composition. That is, for each element $$b_j = \bigvee_{i=1}^{n} (a_i \wedge r_{ij}) \tag{5}$$

Here, V denotes max operation and ∧ min operation. The causality relation $|R$ is given as a knowledge and the feature quantity $|b$ is observable. Hereby, the cause $a$ that causes such a feature quantity $|b$ can be reasoned. The reasoning is given by the Fuzzy backward reasoning. A result of the reasoning gives $$a = (\hat{a}_1, \hat{a}_2 \ldots \hat{a}_m) \tag{6}$$

More specifically, the Fuzzy backward reasoning device 5 receives the feature quantities $|b: b_1$ to $b_n$ from the outside, and reads out the causality relation: $|r^1$ to $|r^n$ from the causality relation storage device 3. It further estimates $\hat{a}_1$ to $\hat{a}_m$ with use of the batch reasoning device 51 and outputs those reasoned values.

Referring now to FIG. 8, a flow chart indicative of operation of the prior art Fuzzy backward reasoning device 5 is illustrated. The operation will be described illustratively. It is assumed that the causality relation $|R$ and the feature quantity $|b$ are inputted into the batch reasoning device 51 from the outside, as follows for example.

$$|R = \begin{bmatrix} 0.4 & 0.0 & 0.9 \\ 0.7 & 0.8 & 0.3 \\ 0.6 & 0.3 & 0.3 \end{bmatrix} \tag{7}$$

$$|b = (0.4\ \ 0.0\ \ 0.9) \tag{8}$$

First in step S1, the number p of solutions is initialized. Then, in step S2, a matrix $|U$ is calculated according to the following equation.

$$u_{ij} = r_{ij} w b_j = \begin{cases} b_j & r_{ij} > b_j \\ (b_j, 1.0) & r_{ij} = b_j \\ \phi & r_{ij} < b_j \end{cases} \tag{9}$$

Here, $(b_j, 1.0)$ indicates a closed interval from $b_j$ to 1.0. $\phi$ means no solution. Likewise, in step S3, a matrix $\tilde{U}$ is calculated according to the following relation.

$$\tilde{u}_{ij} = r_{ij} \tilde{w} b_j = \begin{cases} (0, b_j) & r_{ij} > b_j \\ (0, 1.0) & r_{ij} \leq b_j \end{cases} \tag{10}$$

In the example expressed by the equations (7), (8), $U$, $\tilde{U}$ are given as follows.

$$U = \begin{bmatrix} (0.4, 1.0) & (0.0, 1.0) & (0.9, 1.0) \\ 0.4 & 0.0 & \phi \\ 0.4 & 0.0 & \phi \end{bmatrix} \tag{11}$$

$$\tilde{U} = \begin{bmatrix} (0.0, 1.0) & (0.0, 1.0) & (0.0, 1.0) \\ (0.0, 0.4) & 0.0 & (0.0, 1.0) \\ (0.0, 0.4) & 0.0 & (0.0, 1.0) \end{bmatrix} \tag{12}$$

In step S4, the number L of combinations of non-$\phi$ elements of respective columns of |U is calculated. In case of |U of (11).

$$L = 3 \times 3 \times 1 = 9 \quad (13)$$

In step S5, if the number L is zero, then there is no solution, and the reasoning operation advances to step S12 to output "no solution". If the number L is not zero, then a possibility of L solutions being existent must be taken into consideration. In step S6, one element of each column of U which is not $\phi$ is taken out, and remaining elements are taken out from $\bar{U}$ to form a matrix $W^k$. In the present example |W includes 9 combinations, one of which is for example as follows.

$$W^1 = \begin{bmatrix} (0.4, 1.0) & (0.0, 1.0) & (0.9, 1.0) \\ (0.0, 0.4) & 0.0 & (0.0, 1.0) \\ (0.0, 0.4) & 0.0 & (0.0, 1.0) \end{bmatrix} \quad (14)$$

In step S7, the intersection of the ith row of $W^k$ are taken out to yield the ith element of $\hat{a}$. |W of the expression (14) gives $$\hat{a} = [(0.9, 1.0)\ 0.0\ 0.0] \quad (15)$$

In step S8, if there is any $\phi$ element among those elements in $\hat{a}$, i.e., if there is yielded any intersection in some row of $|W^k$, then $\hat{a}$ in this case is not taken as a reasoning result. In step S9, the number of reasoned results is counted. In step S10, a resulting reasoned result, for example $\hat{a}$ of the expression (15) is outputted. Finally, after L combinations of |W are estimated, in step S11 a decision is done that if P=0 or there is no reasoned result yielded finally, then the operation jumps to step S12 to output "no solution".

The prior art Fuzzy backward reasoning device arranged as described above however has problems as follows. The reasoning can be initiated only after the entire feature quantities $b_1$ to $b_n$ have been observed, thus requiring much time for the reasoning. Additionally, a processor having a higher computational capability is required because the associated computation must be done at a spot.

On the other hand, there is known a prior art target recognition device disclosed, for example as a typical, in Bir Bhanu: Automatic Target Recognition: State of the Art Survey, IEEE Transactions on Aerospace and Electronics, Vol. AE5-22, No. 4, PP 364-379 (1986), as illustrated in FIG. 9. As illustrated in the figures, designated at 101 is a target to be recognized, 151 is an image sensor for observing the target 101 and outputting image information, 152 is a preprocessor for receiving the image information from the image sensor 151, 153 is a target director for receiving an output from the preprocessor, 154 is a segmentation for receiving an output from the target detector 153, 155 is a recognizer for receiving an output from the segmentation 154, 156 is a prior typical target recognition device composed of the image sensor 151, preprocessor 152, target detector 153, segmentation 154, and recognizer 155, and 7 is a behavior deciding device for receiving an output from the target recognition device 156.

The target recognition device 156 shown in FIG. 9 is to recognize the target 101 as an image, and is operable as follows. First, the image sensor 151 observes the target 101 as an image. For the image sensor 151, there are sometimes useable an infrared sensor and a millimeter wave radar. The preprocessor 152 is to receive and previously process an image, the output from the image sensor 151, and output a processed result. In the preprocessing, there are performed restriction of any noise and clutter and emphasis of the contour of the image. The target detector 153 is to receive the image data processed previously as such, and detect from the data a region where there is existent one which might be considered to be a target and output it. The segmentation 154 performs image processing with high accuracy for the detected region, and extracts and outputs a target from the background highly accurately. The recognizer 155 collates the target image to extracted with images involved in a data base and outputs the name of the kind of a so-coincident target. This is an output from the prior typical target recognition device 156. The output is fed to the behavior deciding device 7 as a guide to decide a behavior for responding to the target.

Such prior art target recognition devices recognize a target based upon a single kind of information (image information, for example, if an image sensor is used.) available from a sensor with use of a Neuman type computer as described above. The devices however suffer from not obtaining any information concerning a target if there is outputted no image information from the image sensor 151 because a target is located at a long distance and hence to difficult to be observed as having any shape or a target is in clouds and/or in smoke. Furthermore, the device has a problem that it is unclear to what degree information for recognition of a target from the sensor is reliable.

SUMMARY OF THE INVENTION

To solve the problems of the prior art, it is an object of the invention to provide a Fuzzy backward reasoning device capable of reasoning even if features are observed in an arbitrary order by computing the reasoning in a small quantity at a time each time one feature is observed and updating the reasoned result.

Another object of the present invention is to provide a Fuzzy backward reasoning device capable of achieving a desired purpose by acquiring other pieces of recognition information even when a sensor can not detect certain target information because a target is located at a long distance.

Still another object of the present invention is to provide a target recognition device capable of evaluating as numerical values the reliable degree of a recognized result on the basis of resulting target information.

To achieve the above objects, a Fuzzy backward reasoning device according to the present invention is comprised of causality relation storage means for previously storing each causality relation in which a plurality of feature quantities are caused by a plurality of causes, and of reasoning means for reasoning a cause of the feature quantity using Fuzzy backward reasoning, and is characterized in further including sequential reasoning means as the reasoning means for effecting Fuzzy backward reasoning based upon a feature quantity inputted at this time, a causality relation read from the causality relation storage means corresponding to said feature quantity, and a previous reasoned result, and reasoned result feedback means for feeding back a reasoned result from the sequential reasoning means to an input of the sequential reasoning means.

Furthermore, a target recognition device according to the present invention includes a sensor for observing a target to obtain target information, a plurality of feature extractors each for receiving the target information outputted from said sensor and extracting a feature quantity of the target, and a Fuzzy backward reasoning device for receiving the information having said feature quantity outputted from each feature quantity extractor and effecting Fuzzy backward reasoning, based upon the kinds of targets and recognition information concerning those targets, all having previously been possessed thereby as target candidates, according to the Fuzzy backward reasoning theory.

The above and other objects, features, and advantages of the invention will become more apparent from the following description when taken in conjunction with the accompanying drawings.

DESCRIPTION OF THE PREFERRED EMBODIMENT

In the following, a Fuzzy backward reasoning device according to an embodiment of the present invention will be described with reference to the accompanying drawings.

Figure 1:
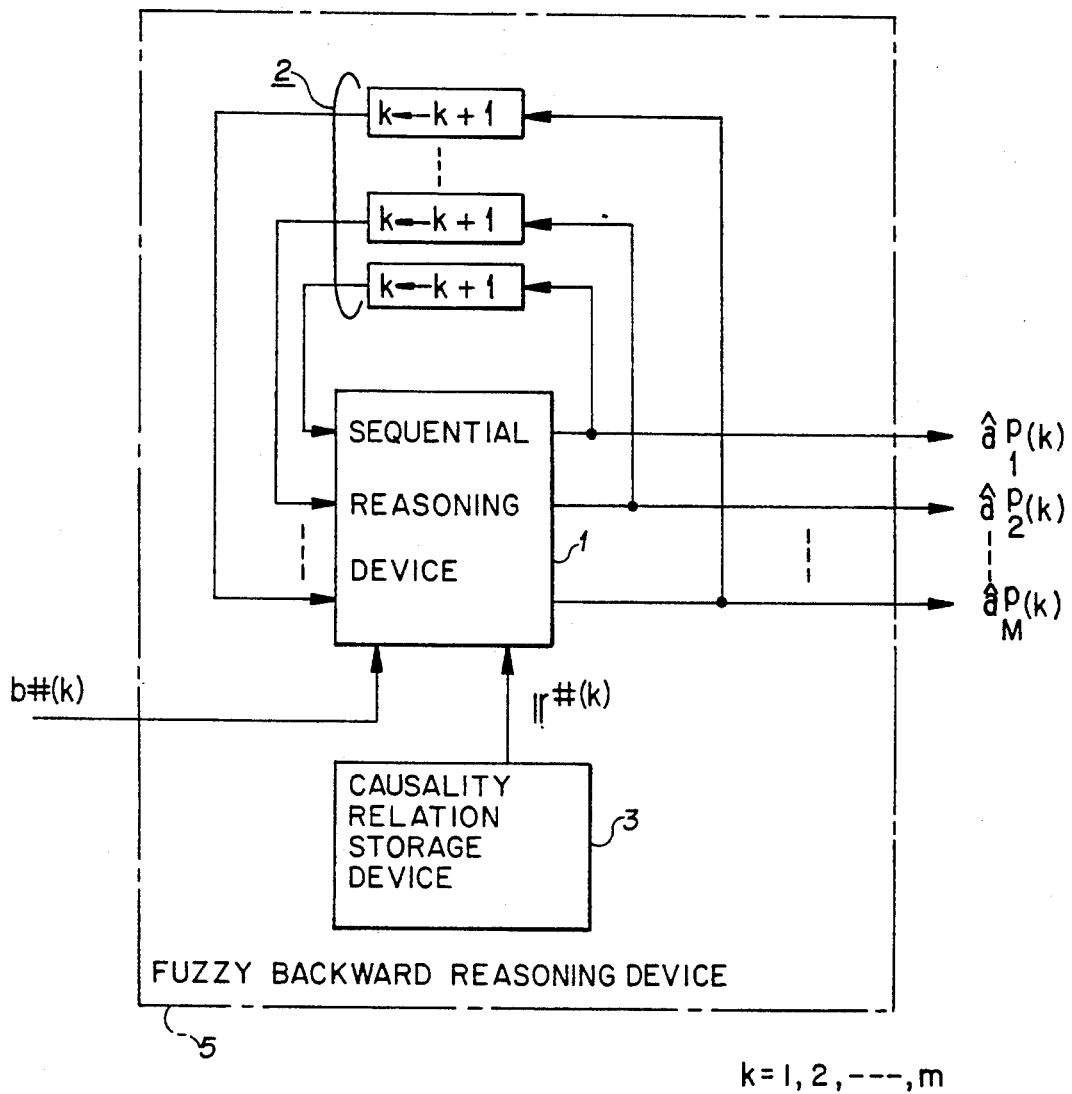
FIG. 1 is a block diagram illustrating a Fuzzy backward reasoning device according to an embodiment of the present invention.

Referring to FIG. 1, a Fuzzy backward reasoning device 5 according to the present invention is illustrated, which includes sequential reasoning device 1 for effecting Fuzzy backward reasoning by inputting thereinto a feature quantity $b_{\#(k)}$ at this time provided from the outside, a reasoned value "$\hat{a}^p (k - 1)$", and a causality relation $|r^{\#(k)}$ corresponding to the feature quantity $b_{\#(k)}$ at this time, and outputting a reasoned result "$\hat{a}^p (k)$"

at this time, reasoned result feedback device 2 for feeding back the reasoned result "$\hat{a}^p (k)$", an output from the sequential reasoning device 1 as a next input to the sequential reasoning device and causality relation storage device 3 for outputting the causality relation $|r^{\#(k)}$ corresponding to the feature quantity $b_{\#(k)}$ at this time to the sequential reasoning device 1. The sequential reasoning device 1 is realizable by executing a program based on a flow chart shown in FIG. 2 by a processor of a computer system, the reasoned result feedback device 2 is likewise realizable by its register, and the causality relation storage device 3 is realizable by its own memory.

Figure 2:
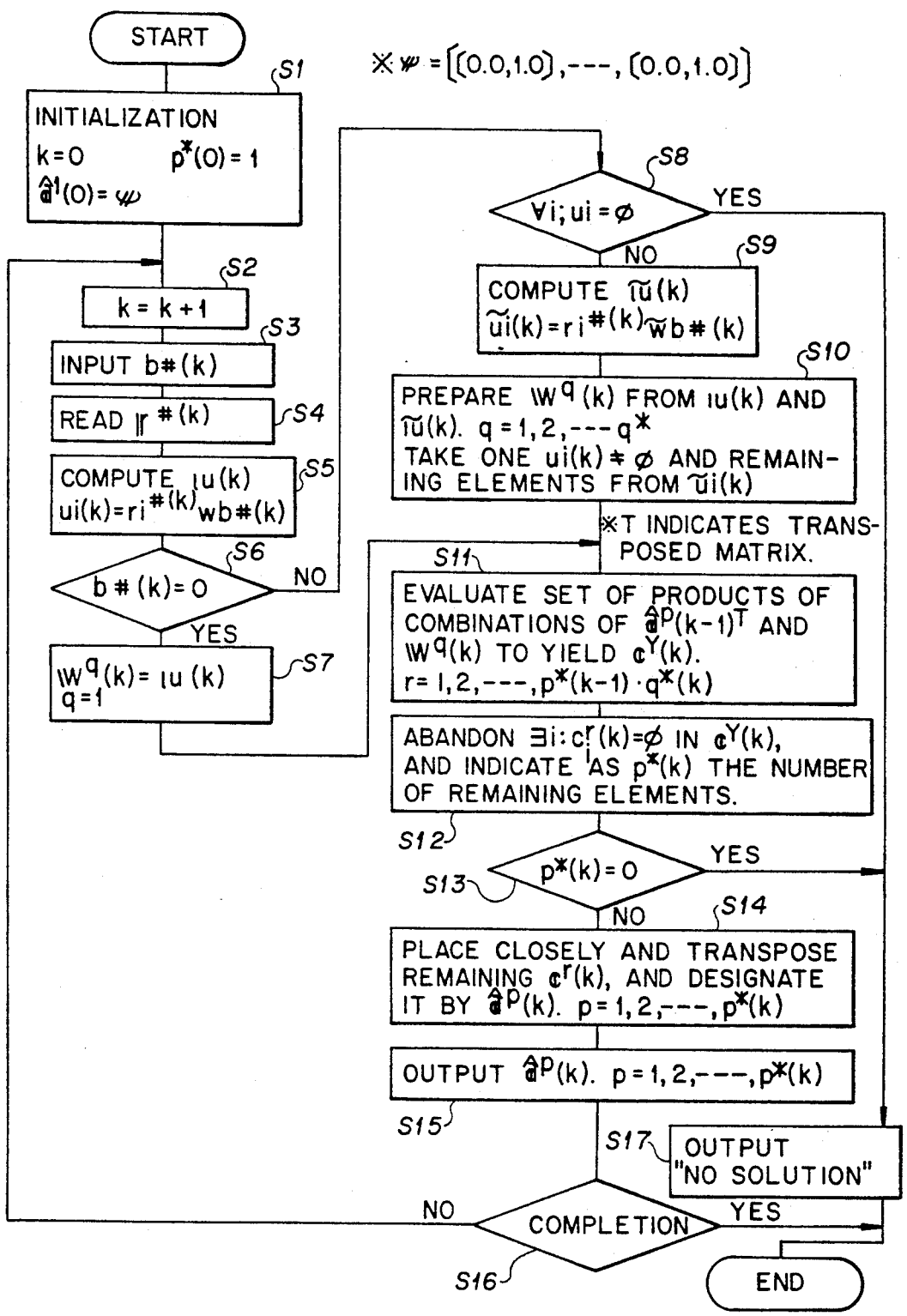
FIG. 2 is a flow chart illustrating the Fuzzy backward reasoning device of FIG. 2.

Referring to FIG. 2, the flow chart indicative of operation of the Fuzzy backward reasoning device 5 of FIG. 1 is illustrated, the operation of the device will be described below illustratively. It is for example assumed that there are given three feature quantities $b_1$, $b_2$, and $b_3$, and that there are correspondingly given causality relations $|r^1$, $|r^2$, and $|r^3$. The values of $b_j$ will be observed, while the values of $|r^j$ have previously been stored in the causality relation storage device 3. Examples of values of $|r^j$ are given as follows $$|r^1 = \begin{bmatrix} 0.4 \\ 0.7 \\ 0.6 \end{bmatrix}, |r^2 = \begin{bmatrix} 0.0 \\ 0.8 \\ 0.3 \end{bmatrix}, |r^3 = \begin{bmatrix} 0.9 \\ 0.3 \\ 0.3 \end{bmatrix} \quad (16)$$

First, in step S1, a count k, the number p*(k) of k-th reasoned results, and a reasoned result $\hat{a}^1(k)$ are initialized. Then, in step S2, the count is increased by 1. In step S3, a feature quantity $b_{\#(k)}$ observed at k-th time is inputted into the sequential reasoning device 1. In step S4, a causality relation $|r^{\#(k)}$ corresponding to the feature quantity $b_{\#(k)}$ is read out from the causality relation storage device 3. For example, a feature quantity observed at k=1 time concerns $b_1$, and it is assumed that $b_1$ is equal to 0.4. At this time, $b_{\#(k)}$ and $|r^{\#(k)}$ at #(k) are given as follows.

$$b_{\#(1)} = b_1 0.4 \quad (17)$$

$$|r^{\#(1)} = |r^1 = \begin{bmatrix} 0.4 \\ 0.7 \\ 0.6 \end{bmatrix} \quad (18)$$

In step S5, operation expressed by (9) is executed to compute a vector $\mathbb{U}(k)$;

$$\mathbb{U}(1) = \begin{bmatrix} (0.4, 1.0) \\ 0.4 \\ 0.4 \end{bmatrix} \quad (19)$$

In step S6, it is decided whether or not $b_{\#(k)} = 0$, and if $b_{\#(k)} = 0$, then $\mathbb{W}^1(k) = \mathbb{U}(k)$ is executed in step S7 and jumps to step S11. If $b_{\#(k)} \neq 0$, then it is judged in step S8 whether or not all elements of $|u(k)$ are $\phi$. If all are $\phi$, then the operation jumps to step S17 to output "no solution", or otherwise advances to step S9. In step S9, operation of (10) is executed to compute the vector $\widetilde{\mathbb{U}}(k)$.

$$\widetilde{u}(1) = \begin{bmatrix} (0.0, 1.0) \\ (0.0, 0.4) \\ (0.0, 0.4) \end{bmatrix} \quad (20)$$

In step S10, one of the elements in $|u(k)$ which are not $\phi$ is taken out and remaining elements are taken from $\widetilde{u}(k)$ to form $W^q(k)$. In this example, there are three vectors of such $W^q(k)$:

$$W^1(1) = \begin{bmatrix} (0.4, 1.0) \\ (0.0, 0.4) \\ (0.0, 0.4) \end{bmatrix}, \quad (21)$$

$$W^2(1) = \begin{bmatrix} (0.0, 1.0) \\ 0.4 \\ (0.0, 0.4) \end{bmatrix},$$

$$W^3(1) = \begin{bmatrix} (0.0, 1.0) \\ (0.0, 0.4) \\ 0.4 \end{bmatrix}$$

In step S11, $C^r(k)$ is constructed by evaluating a set of intersection between $W^q(k)$ of the equation (21) and a reasoned result $\hat{a}^P(k-1)^T$ reasoned from feature quantities up to the previous time. Here, T indicates transposition.

$$C^1(1) = \begin{bmatrix} (0.4, 1.0) \\ (0.0, 0.4) \\ (0.0, 0.4) \end{bmatrix}, \quad (22)$$

$$C^2(1) = \begin{bmatrix} (0.0, 1.0) \\ 0.4 \\ (0.0, 0.4) \end{bmatrix},$$

$$C^3(1) = \begin{bmatrix} (0.0, 1.0) \\ (0.0, 0.4) \\ 0.4 \end{bmatrix}$$

In step S12, vectors with $\phi$ in $C^r(k)$ are abandoned, and the number of remaining vectors are denoted by $p^*(k)$. In step S13, if $p^*(k)=0$, i.e. all $C^r(k)$ are abandoned, then the operation jumps to step S17 to output "no solution". If $p^*(k) \neq 0$, then the operation advances to step S14, and remaining $C^r(k)$ are transposed and denoted by $\hat{a}^P(k)$.

$$\hat{a}^1(1) = [(0.4, 1.0) (0.0, 0.4) (0.0, 0.4)] \quad (23)$$

$$\hat{a}^2(1) = [(0.0, 1.0) \ 0.4 \ (0.0, 0.4)]$$

$$\hat{a}^3(1) = [(0.0, 1.0) (0.0, 0.4) \ 0.4].$$

In step S15, $\hat{a}^P(k)$ of the expression is outputted as a k-th time reasoned value. If overall reasoning is judged in step S16 not to have been completed, then the operation returns to the step S2 to repeat the algorithm. This is done by the reasoned result feedback device 2. At the time all feature quantities have completely been reasoned, a given reasoned value is reached. In the present example, furthermore, $b_3$ is assumed to be observed 0.9 at $k=2$ times, and finally $b_2$, 0.0. The feature is given as follows, in case of $k=2$.

$$b_{\#(2)} = b_3 = 0.9 \quad (24)$$

$$|r^{\#(2)} = |r^3 = \begin{bmatrix} 0.9 \\ 0.3 \\ 0.3 \end{bmatrix}. \quad (25)$$

After the same computation as in $k=1$, the following reasoning is reached.

$$\hat{a}^1(2) = [(0.9, 1.0) (0.0, 0.4) (0.0, 0.4)] \quad (26)$$

$$\hat{a}^2(2) = [(0.9, 1.0) \ 0.4 \ (0.0, 0.4)]$$

$$\hat{a}^3(2) = [(0.9, 1.0) (0.0, 0.4) \ 0.4].$$

Moreover, at $k=3$, the feature is given as follows.

$$b_{\#(3)} = b_2 = 0.0 \quad (27)$$

$$|r^{\#(3)} = |r^2 = \begin{bmatrix} 0.0 \\ 0.8 \\ 0.3 \end{bmatrix}. \quad (28)$$

After the same computation as in $k=1$, the following reasoning is finally reached.

$$\hat{a}^1(3) = [(0.9, 1.0) \ 0.0, 0.0] \quad (29)$$

Figure 3:
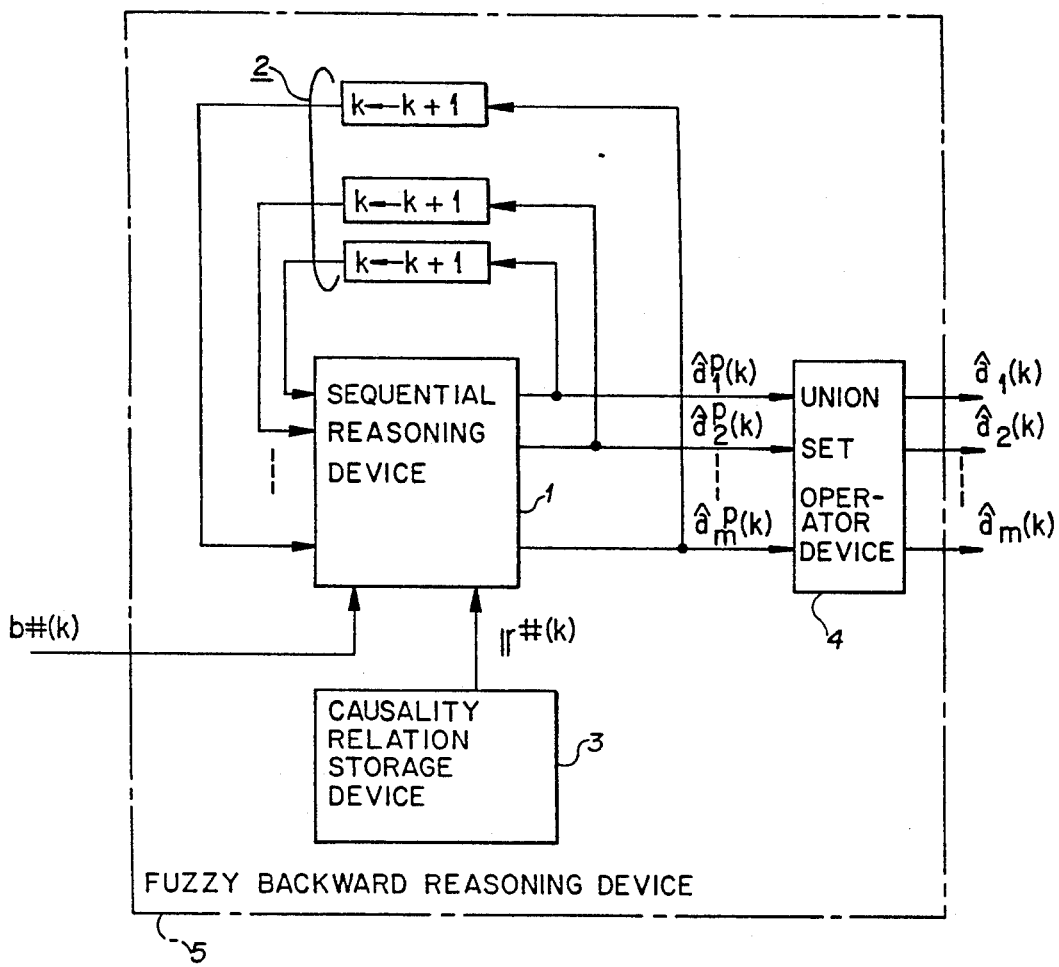
FIG. 3 is a block diagram illustrating a Fuzzy backward reasoning device according to another embodiment of the present invention.

In the above embodiment, there are existent $p^*(k)$ reasoned results $\hat{a}^P(k)$. Actually, however, if there are existent a plurality of reasoned results, the processing thereof is complicated. It is accordingly sometimes desirable that they are jointly outputted as one signal. FIG. 3 illustrates another embodiment of the present invention suitable for such a situation. In the figure, designated at 5 is unison set operation device for evaluating a union set, which effects the following operation with respect to each element $$\hat{a}_i^P(k)$$

of $\hat{a}^P(k)$.

$$\hat{a}_i(k) = \bigcup_{P=1}^{P^*(k)} \hat{a}_i^P(k) \quad (30)$$

Here, U means a union operator. It is also effective that the $p^*(k)$ reasoned results are put together into $\hat{a}(k)=(a_i(k))$ which is then outputted as an reasoned result of the Fuzzy backward reasoning device according to the present invention.

According to the present invention, as described above, the sequential reasoning device for effecting sequential reasoning instead of the batch reasoning device for effecting batch reasoning is provided together with the feedback device for feeding back a reasoning result. Accordingly, all feature quantities are not required to be completely observed, so that the reasoning can be updated each time such a feature quantity is observed in an arbitrary sequence. Additionally, also for the reasoning computation, vector computation is carried out progressively instead of batch computation of a matrix without requiring a processor with high computation capability.

Herein, it is also effective in the Fuzzy backward reasoning device of the present invention described above to construct the target recognition device by additionally providing a sensor for observing a target as the cause, a feature quantity extractor for extracting a feature quantity of the target based upon an output from the sensor, and extraction device for receiving an output from the feature quantity extractor and extracting an activated feature quantity from the received output.

In the following a target recognition device as a concrete exemplary application of the present invention will be described with reference to the accompanying drawings.

Figure 4:
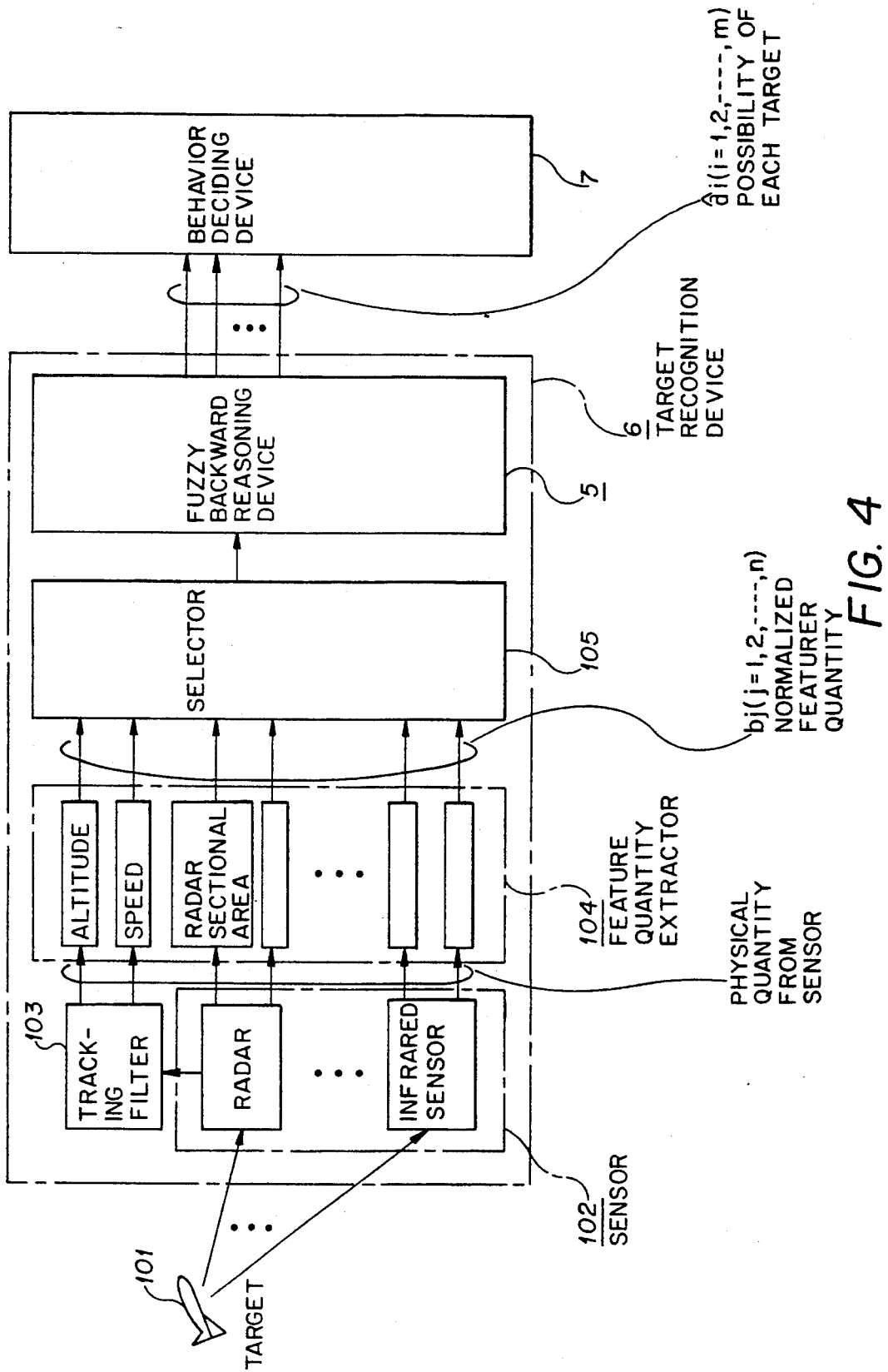
FIG. 4 is a block diagram illustrating a target recognition device as an exemplary concrete application of the present invention.

In FIG. 4, designated at 101 is a target to be recognized, 102 are a plurality of sensors for observing the target 101, 103 is a tracking filter for receiving observed values of a target position from the sensors 102 to estimate the accurate position, speed, and acceleration and output an estimated result, 104 are a plurality of feature quantity extractors for receiving the outputs from the sensors 102 or the output from the tracking filter 103 to extract and output a feature quantity, 105 is a selector for receiving an output from the feature quantity extractor 104 to extract an activated feature quantity from the output, 5 is a Fuzzy backward reasoning device for receiving an output from the selector 105 to reason the kind of the target 101 according to the Fuzzy backward reasoning, 6 is a target recognition device according to the present invention, the device comprising the sensor 102, tracking filter 103, feature quantity reasoning device 104, selector 105, and Fuzzy backward extractor 5, and 7 is a behavior deciding device for receiving an output from the target recognition device 6.

Operation of the target recognition device constructed as described above is as follows.

First, although there are available a radar and an infrared sensor for the sensor 102, only a radar is here used for brevity to observe the target 101. An output from the sensor is of a physical quantity.

The tracking filter 103 receives an observed position of the target 101 as an output from the radar 102 to reason the accurate position and speed of the target and output a reasoned result. The tracking filter 103, although not an independent sensor, provides information concerning the target 101 as in the other sensor 102.

The plurality of the feature quantity extractors 104 serve to reason any information useful for target recognition based upon an output from the sensor 102 or the tracking filter 103. An output from the feature quantity extractor 104 is a feature quantity normalized to a value from zero to one. Although in FIG. 4 each feature quantity extractor 104 is shown to obtain a separate sensor output, there may in general be a situation where a plurality of the feature quantity extractors 104 receive the same sensor output and output different feature quantities. Three feature quantity extractors 104 are assumed here: one for receiving an output from the radar 102, and computing and outputting a radar sectional area of the target 101, second for receiving an output from the tracking filter 103, and detecting and outputting the invasion altitude of an invading target, last one for receiving the output from the tracking filter 103, and computing and outputting the speed of the target 101. The selector 105 for reasoning an activated feature quantity serves to transmit to the Fuzzy backward reasoning device 5 one feature quantity among a plurality of those feature quantities as the output from the feature quantity extractor 104, the one feature quantity being actually obtained at a certain time point.

The Fuzzy backward reasoning device 5 receives the three feature quantities: radar sectional area, invasion altitude, and speed, each being outputs from the three feature quantity extractors 104. For the kinds of the targets 101 there are imagined three candidates of giant-sized passenger planes, fighters, and cruising missiles. Accordingly, the Fuzzy backward reasoning device 5 computes and outputs a probable distribution on those three target candidates by solving an inverse problem. The output is indicative of a possibility normalized to a value from 0 to 1.

Now, operation of the Fuzzy backward reasoning device 5 will be described according to the just-mentioned example.

It is imagined with a giant-sized passenger plane that it does not invade at a low altitude and not fly at a very high speed, and further its radar cross section is great. It is now assumed for example that the degree of the low altitude invasion is 0.0, the degree of the high speed 0.3, and the degree of the greater radar cross section 1.0. It is likewise assumed with a fighter that those degrees are 0. 5, 1.0, and 0.5, respectively. With a cruising missile, these degrees are 1.0, 0.3, and 0.2, respectively. These relations are expressed as follows:

$$[a_1 \ a_2 \ a_3] \ 0 \begin{bmatrix} 0.0 & 0.3 & 1.0 \\ 0.5 & 1.0 & 0.5 \\ 1.0 & 0.3 & 0.2 \end{bmatrix} = [b_1 \ b_2 \ b_3] \quad (31)$$

Here, a symbol 0 indicates maximum composition. For example, $b_1$ is computed as follows:

$$b_1 = \max[\min(a_1, 0.0) \min(a_2, 0.5), \min(a_3, 1.0)] \quad (32)$$

Additionally, $a_1, a_2, a_3$ show possibilities of a giant-sized passenger plane, a fighter, and a cruising missile, respectively. Likewise, $b_1, b_2, b_3$ show the degrees of low altitude invasion, of a high speed, and of a greater radar cross section. Both are numerical values ranging from 0 to 1.

The Fuzzy backward reasoning device 5 possesses the determinant (31) as a knowledge and receives $[b_1, b_2, b_3]$ on the right side as an output from the feature quantity extractor 104 to reason $[a_1, a_2, a_3]$ on the left side. This is called the Fuzzy backward reasoning. It should here be noticed that $[b_1, b_2, b_3]$ is defined uniquely if $[a_1, a_2, a_3]$ is given, but reversely $[a_1, a_2, a_3]$ is not defined uniquely, if $[b_1, b_2, b_3]$ is given. No solution might sometimes be existent. This means that the possibilities of a target with which the same feature quantity pattern might be caused are not necessarily limited to a single distribution.

For the Fuzzy backward reasoning, the following two operations $\tilde{w}$, $w$ will be introduced.

$$p\tilde{w}q = \begin{cases} q & (p > q) \\ [q, 1] & (p = q) \\ \phi & (p < q) \end{cases} \quad (33)$$

-continued $$pwq = \begin{cases} [0, q] & (p > q) \\ [0, 1] & (p \leq q) \end{cases} \quad (34)$$

Herein, [p, q] indicates a closed interval from p to q, and $\phi$ indicates no solution.

Figure 5:
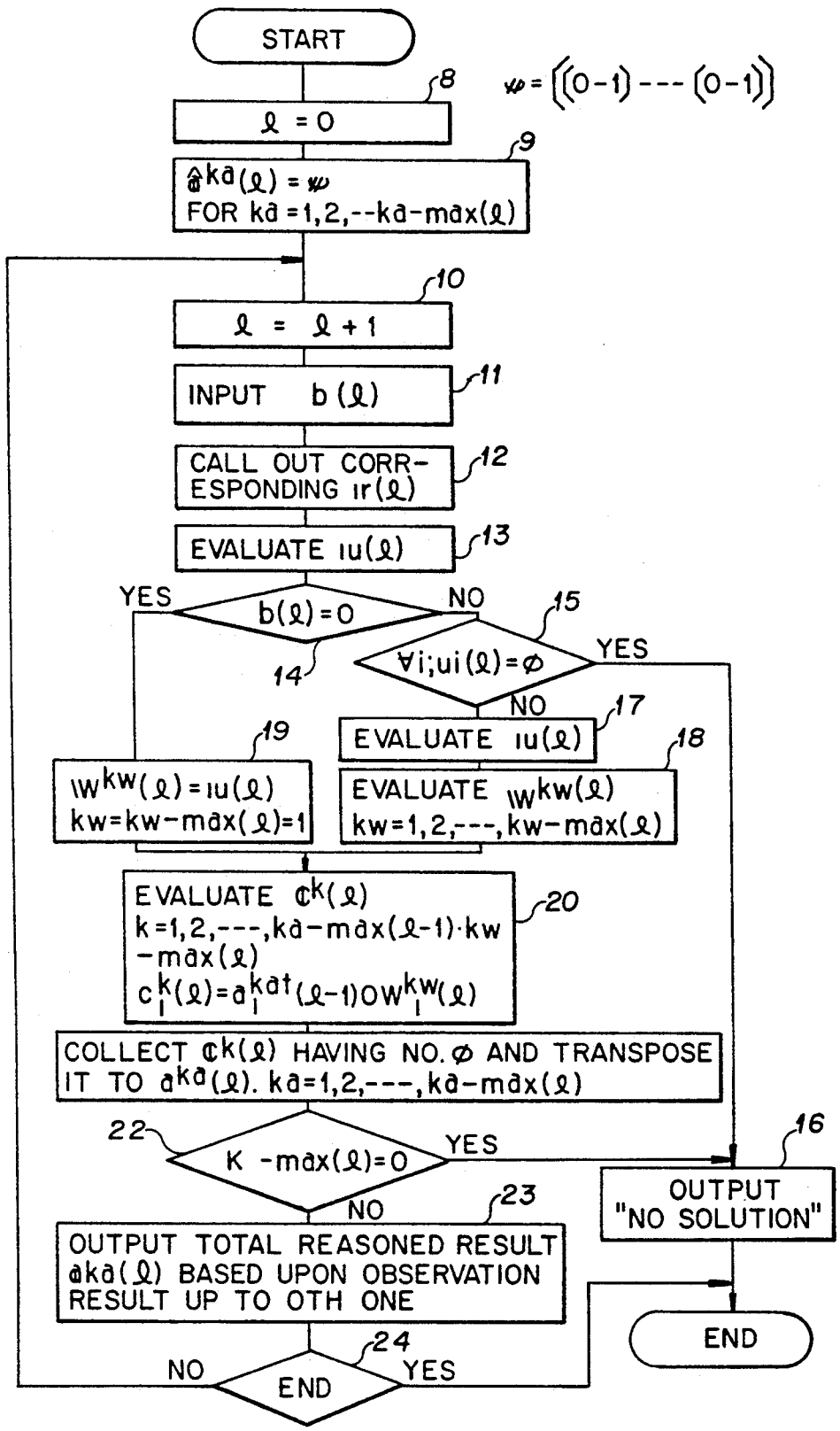
FIG. 5 is a flow chart illustrating operation of a sequential Fuzzy backward reasoning device in the target recognition device.
Figure 6:
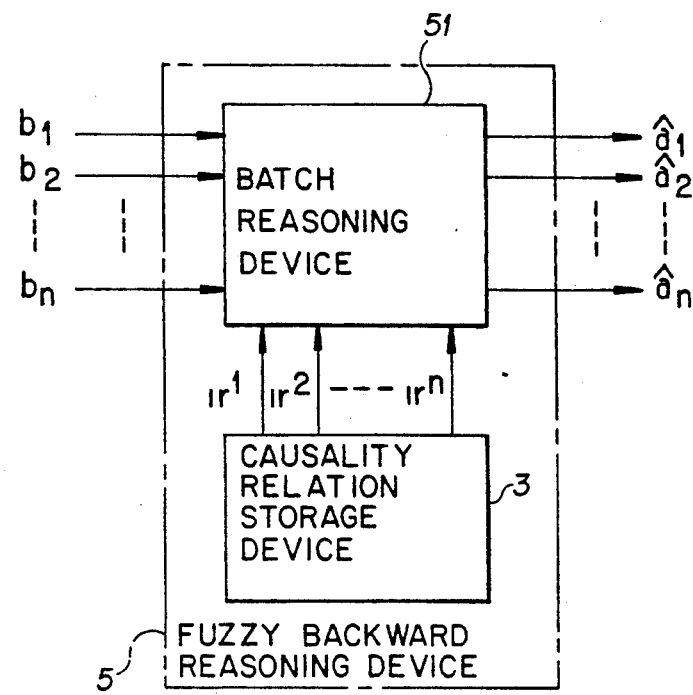
FIG. 6 is a block diagram illustrating a prior art Fuzzy backward reasoning device.
Figure 7:
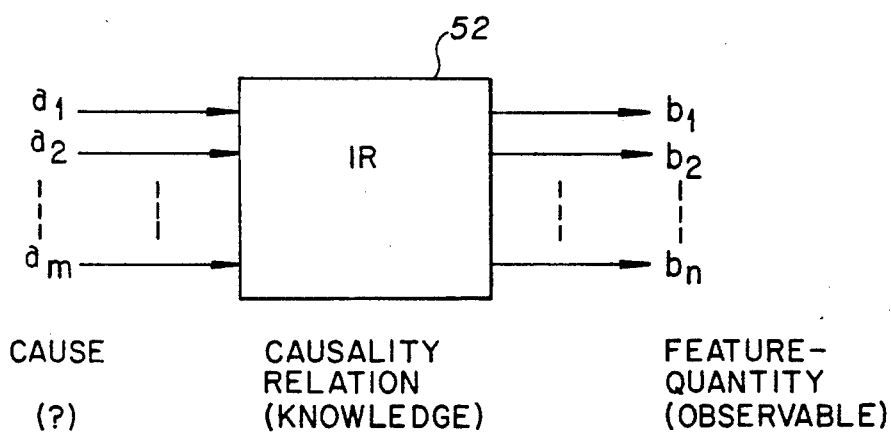
FIG. 7 is a block diagram illustrating the setting of a problem in Fuzzy backward reasoning.
Figure 8:
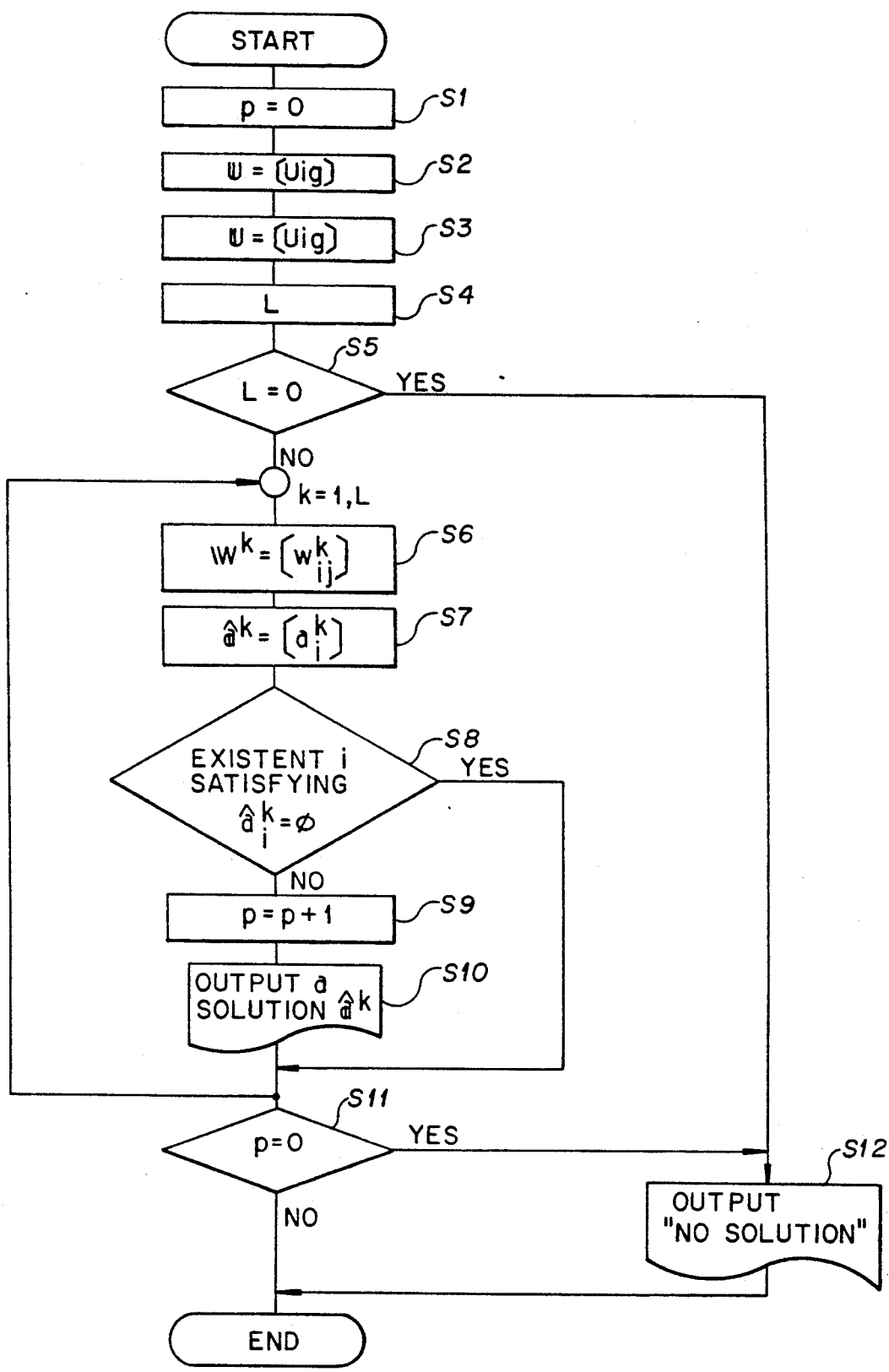
FIG. 8 is a flow chart illustrating operation of the prior art Fuzzy backward reasoning device.
Figure 9:
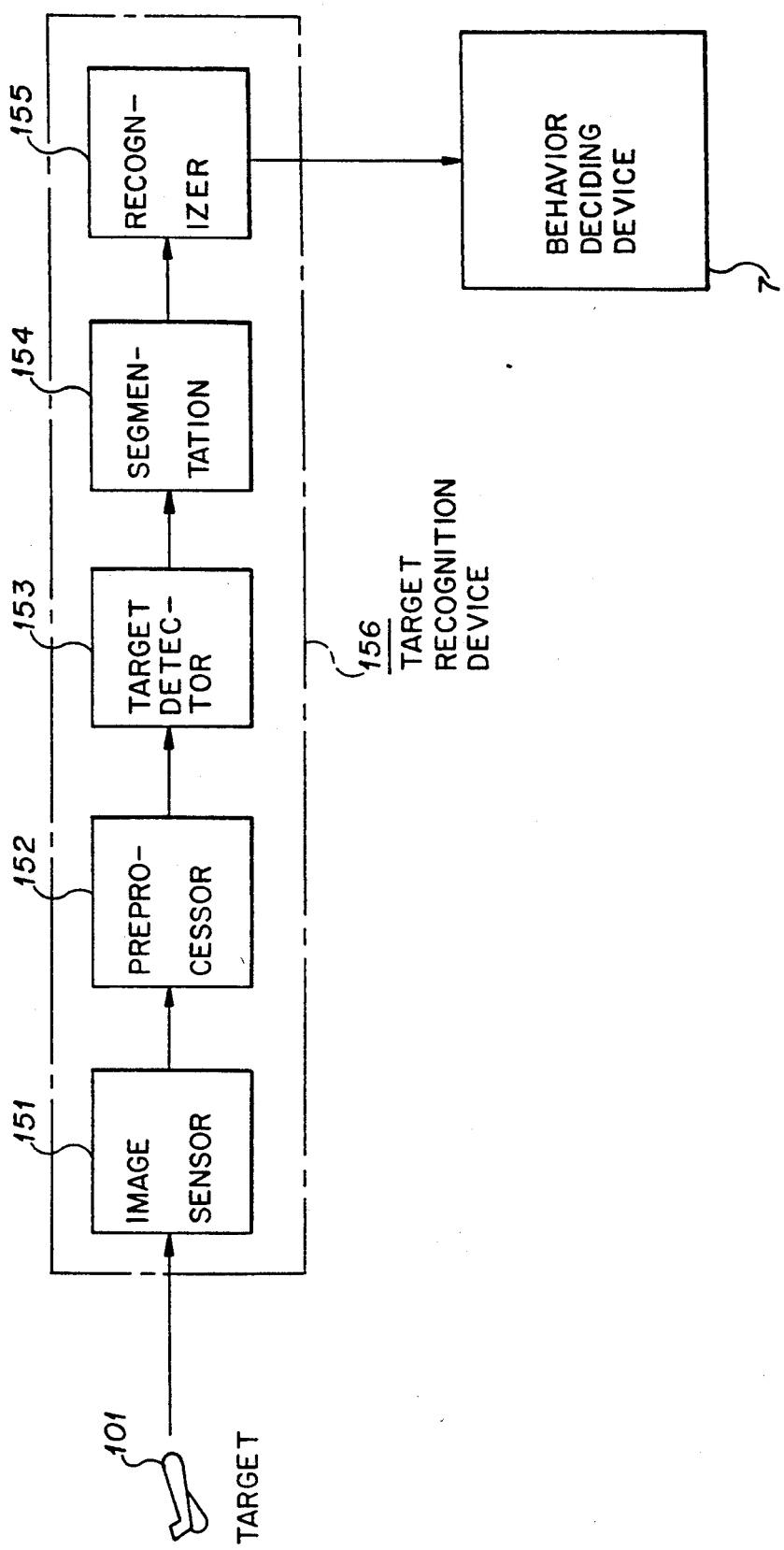
FIG. 9 is a block diagram illustrating a prior art target recognition device.

Moreover, in order to perform on-line target recognition it is necessary to utilize a sequential type Fuzzy backward reasoning device as the Fuzzy backward reasoning device 5 in which reasoning is effected every time one feature quantity is obtained and candidates are gradually narrowed down. Feature quantities $b_j$ (j=1,2,3) normalized successively one by one are inputted through the selector 105 that is to extract an activated feature quantity, and then compute and output reasoned values $\hat{a}_i$ (i=1,2,3) of possibilities of each target. FIG. 5 illustrates a flow chart indicative of operation of the sequential type Fuzzy backward reasoning device.

In steps 8, 9, associated algorithm is initialized, in which l is a count showing a feature quantity at which number is inputted, and $\hat{a}^{ka}(l)$ is a probable reasoned value of the kind of a target yielded by the sequential type Fuzzy backward reasoning, i.e., a reasoned value of the aforementioned possibilities $[a_1, a_2, a_3]$. Those probable reasoned values are quite unknown initially and hence range from 0 to 1.

$$\hat{a}^{ka}(0) = \phi = [[0-1], \ldots, [0-1]] \quad (35)$$

Herein, $K_a$−max(0) is the number of memories for $\hat{a}(l)$ previously prepared.

In step 10, l is updated by 1.

In step 11, the l-th feature quantity b(l) is inputted from the feature quantity extractor 104. For example, in the example of the equation (31) $b_1$ is inputted.

In step 12, a relevant vector $\mathbf{r}(l)$ corresponding to the l-th feature quantity b(l) is inputted. $\mathbf{r}(1) = [0.0\ 0.5\ 1.0]^T$ here corresponds to $b_1$ of the equation (31). T indicates transposition.

In step 13, $\mathbf{u}(l) = [u_i(l)]$ is computed as follows.

$$u_i(l) = r_i(l)^{\omega} b(l) \quad (36)$$

Here, $u_i(l)$ and $r_i(l)$ indicate i-th elements of the vectors $\mathbf{u}(l)$ and $\mathbf{r}(l)$, respectively. The following relation holds when $b_1$ of the equation (31) satisfies $b_1 0.5$, for example.

$$\mathbf{u}(1) = \begin{bmatrix} 0.0\ \omega\ 0.5 \\ 0.5\ \omega\ 0.5 \\ 1.0\ \omega\ 0.5 \end{bmatrix} = \begin{bmatrix} \phi \\ [0.5-1.0] \\ 0.5 \end{bmatrix} \quad (37)$$

In step 14, the operation branches off depending upon whether b(l)=0 or not.

In step 15, a case b(l)≠0 is processed, i.e., the operation again branches off depending upon whether all computed elements $\mathbf{u}(l)$ are $\phi$ or not.

In step 16, the operation is with the former case and outputs "no solution".

In step 17, the operation is with the latter case and $\tilde{\mathbf{u}}(l) = [\tilde{u}_i(l)]$ is computed as follows.

$$\tilde{u}_i(l) = r_i(l) \cdot \bar{\omega} b(l) \quad (38)$$

The following expression holds when $b_1$ in the equation (31) satisfies $b_1 = 0.5$.

$$\tilde{\mathbf{u}}(l) = \begin{bmatrix} 0.0\ \bar{\omega}\ 0.5 \\ 0.5\ \bar{\omega}\ 0.5 \\ 1.0\ \bar{\omega}\ 0.5 \end{bmatrix} = \begin{bmatrix} [0.0-1.0] \\ [0.0-1.0] \\ [0.0-0.5] \end{bmatrix} \quad (39)$$

In step 18, $\mathbf{w}^{kw}(l)$ is computed. $\mathbf{w}^{kw}(l)$ possesses the same dimension as those of $\mathbf{u}(l)$ and $\tilde{\mathbf{u}}(l)$ and selects one element thereof from non-$\phi$ elements of $\mathbf{u}(l)$ and remaining elements thereof from $\tilde{\mathbf{u}}(l)$. Such $\mathbf{w}^{kw}(l)$ is existent by kw-max(l) and kw (l) on the right shoulder of $\mathbf{w}(l)$ indicates that $\mathbf{w}^{kw}(l)$ is kw-th w (l). If $b_1=0.5$, then kw-max(1)=2, and hence $\mathbf{w}(1)$ has the following two components.

$$\mathbf{w}^1(1) = \begin{bmatrix} [0.0-1.0] \\ [0.5-1.0] \\ [0.0-0.5] \end{bmatrix}, \quad (40)$$

$$\mathbf{w}^2(1) = \begin{bmatrix} [0.0-1.0] \\ [0.0-1.0] \\ 0.5 \end{bmatrix}$$

In step 19, the operation is with a case where b=0 in the step 14, and there is existent only one $\mathbf{w}^{kw}(l)$ as follows.

$$\mathbf{w}^1(l) = \tilde{\mathbf{u}}(l) \quad (41)$$

In step 20, the operation takes intersection between an (l−1)-th reasoned result $\hat{a}^{ka}(l-1)$ and information $\mathbf{w}^{kw}(l)$ of a solution obtained this time:

$$C_i^k(l) = a_i^{K_a T}(l-1) \cap W_i^{KW}(l) \quad (42)$$

$K_a$ and $K_w$ are existent by
$K_a = 1, 2, \ldots, K_a$−max (l−1)
$K_w = 1, 2, \ldots, K_w$−max (l),
and hence $C_i^k(l)$ is eventually existent by
$K = 1, 2, \ldots, K_a$−max(l−1)·$K_w$−max(l). But, there is rejected K-th $C^k(l)$ where there is existent any i that satisfies $C_i^k(l) = \phi$ in the equation (42).

In the present example, $C_i^k(l)$ is given as follows.

$$C^1(1) = \begin{bmatrix} [0.0-1.0] \\ [0.0-1.0] \\ [0.0-1.0] \end{bmatrix} \cap \begin{bmatrix} [0.0-1.0] \\ [0.5-1.0] \\ [0.0-1.5] \end{bmatrix} = \begin{bmatrix} [0.0-1.0] \\ [0.5-1.0] \\ [0.0-0.5] \end{bmatrix} \quad (43)$$

$$C^2(1) = \begin{bmatrix} [0.0-1.0] \\ [0.0-1.0] \\ [0.0-1.0] \end{bmatrix} \cap \begin{bmatrix} [0.0-1.0] \\ [0.0-1.0] \\ 0.5 \end{bmatrix} = \begin{bmatrix} [0.0-1.0] \\ [0.0-1.0] \\ 0.5 \end{bmatrix} \quad (44)$$

In step 21, there is computed as a solution a transposed vector of $C^k(l)$; $l=1,2,\ldots, K_a$−max·$K_w$−max computed in the previous step and not rejected in the same step. $\hat{a}^{ka}(l)$; $K_a 1, 2, \ldots, K_a$−max(l) is yielded by putting close blanks produced by removal and applying numbers $K_a$ anew. In the present example, $$\hat{a}^1(l) = \mathbb{C}^{1T}(l) = \begin{bmatrix} [0.0-1.0] \\ [0.5-1.0] \\ [0.0-0.5] \end{bmatrix}^T \quad (45)$$

$$\hat{a}^2(l) = \mathbb{C}^{2T}(l) = \begin{bmatrix} [0.0-1.0] \\ [0.0-1.0] \\ 0.5 \end{bmatrix}^T \quad (46)$$

In step 22, it is judged whether $K_a - \max(l) = 0$ or not. If 0, then the operation skips to the step 16.

In step 23, reasoned results $\hat{a}^{ka}(l)$ until present time, i.e., up to l-th one are outputted.

In step 24, it is judged whether the reasoning should be completed or not, and if not so, then the operation returns to the step 10.

In such a manner, a new reasoned value $\hat{a}(l)$ is yielded every time a new feature quantity is detected and evaluated. For example, $\hat{a}^{ka}(1)$ in the equations (45), (46) was yielded by the first reasoning in the present example. The interpretation is as follows. First, $\hat{a}_1'(1) = [0.0-1.0]$ reveals that the possibility of the target to be a giant-sized passenger plane ranges from 0.0 to 1.0, i.e., it can never be judged on the basis of the information obtained up to now that the target is a giant-sized passenger plane. Likewise, $\hat{a}_2'(1) = [0.5-1.0]$ reveals the possibility of the target to be a fighter falls within 0.5–1.0. The Fuzzy backward reasoning demonstrates a feature that the reliability of a recognition result is generally expressed with certain width. The width is generally narrowed progressively as the number l of times of the reasoning advances. This means a reasoned result is convergent.

An output from the sequential type Fuzzy backward reasoning device 5 operable as described above is an output from the target recognition device 6 according to the present invention and an input to the behavior deciding device 7. The behavior deciding device with a reasoned result "no solution" judges that a target would be any one other than candidates of a supposed target, and gives a warning for an alter. Additionally, the behavior deciding device 7 judges, without a particular alert, when a reasoned result is $$[\hat{a}_1 \, \hat{a}_2 \, \hat{a}_3] = [1.0 \, 0.0 \, 0.0]$$

in the aforementioned example, that a target would surely be a giant-sized passenger plane without a possibility of the target to be a fighter or a cruising missile. Moreover, if the reasoned result is given by $$[\hat{a}_1 \, \hat{a}_2 \, \hat{a}_3] = [[0.0-0.2][0.0-0.3]1.0],$$

for example, then the behavior deciding device 7 judges that the result clearly shows the feature of a cruising missile although the features of a giant-sized passenger plane and a fighter can also be found, and outputs an instruction an emergency measure should be take against the cruising missile.

Although in the above embodiment only a radar was incorporated as the sensor 102, such a single sensor may be useable as a special case of a plurality of sensors. However, use of a plurality of sensors is rather standardized if a certain sensor is not useable and hence another sensor is utilized for obtaining information.

Furthermore, although in the above embodiment the sequential type Fuzzy backward reasoning device was employed as the Fuzzy backward reasoning device 5, non-sequential type algorithm may also be useable if no on-line construction is required. In this case the selector 105 is unnecessary.

Additionally, although in the above embodiment the tracking filter 103 was incorporated additionally, the target recognition device of the present invention can effectually incorporated without use of such a filter.

What is claimed is:

1. A Fuzzy backward reasoning device comprising:
   sensor means responsive to a cause for supplying feature quantities at arbitrary times; and
   a computer system comprising:
      causality relation storage means for storing causality relations between said feature quantities and causes of said feature quantities;
      sequential reasoning means for performing Fuzzy backward reasoning during each of a plurality of sequential reasoning periods and outputting a reasoned result, said sequential reasoning means being responsive during each sequential reasoning period to an input feature quantity from said sensor means, a corresponding causality relation from said causality relation storage means and a previous reasoned result from a previous reasoning period, said reasoned result indicating the cause of the input feature quantity; and
      feedback means responsive to outputs of said sequential reasoning means for providing a previous reasoned result to an input of said sequential reasoning means during each of said sequential reasoning periods.

2. A Fuzzy backward reasoning device as defined in claim 1 further including union set operation means for taking the union of the reasoned results of each of the sequential reasoning periods and outputting a final reasoned result representative of the cause of the feature quantities.

3. A Fuzzy backward reasoning device as defined in claim 2 further including means for selecting an action to be taken in response to the final reasoned result.

4. A Fuzzy backward reasoning device comprising:
   sensor means responsive to a cause for supplying feature quantities at arbitrary times; and
   a digital computer, said digital computer comprising:
      causality relation storage means for storing causality relations between said feature quantities and causes of said feature quantities;
      sequential reasoning means for performing Fuzzy backward reasoning during each of a plurality of sequential reasoning periods and outputting a reasoned result, said sequential reasoning means being responsive during each sequential reasoning period to an input feature quantity from said sensor means, a corresponding causality relation from said causality relation storage means and a previous reasoned result from a previous reasoning period, said reasoned result indicating the cause of the input feature quantity; and
      means responsive to outputs of said sequential reasoning means for providing a previous reasoned result to an input of said sequential reasoning means during each of said sequential reasoning periods.

5. A Fuzzy backward reasoning device comprising:
   sensor means responsive to a cause for supplying feature quantities at arbitrary times; and a computer system comprising:
causality relation storage means for storing causality relations between said feature quantities and causes of said feature quantities;
a first processor portion for performing Fuzzy backward reasoning during each of a plurality of sequential reasoning periods and outputting a reasoned result, said first processor portion being responsive during each sequential reasoning period to an input feature quantity from said sensor means, a corresponding causality relation from said causality relation storage means and a previous reasoned result from a previous reasoning period, said reasoned result indicating the cause of the input feature quantity; and a second processor portion responsive to outputs of said first processor portion for providing a previous reasoned result to an input of said first processor portion during each of said sequential reasoning periods.

6. A Fuzzy backward reasoning device as defined in claim 5 further including third processor means comprising union set operation means for taking the union of the reasoned results of each sequential reasoning period for providing a final reasoned result representative of the cause of the feature quantities.

7. A Fuzzy backward reasoning device as defined in claim 6 further including means for selecting an action for responding to the final reasoned result.

* * * * *